Patented Nov. 18, 1930

1,782,112

UNITED STATES PATENT OFFICE

HAROLD S. ADAMS, OF LARCHMONT, NEW YORK, AND LUDWIG MEUSER, OF BOUND BROOK, NEW JERSEY, ASSIGNORS TO THE NAUGATUCK CHEMICAL COMPANY, OF NEW HAVEN, CONNECTICUT, A CORPORATION OF CONNECTICUT

METHOD OF TREATING MIXTURES OF AMINES

No Drawing. Application filed August 4, 1925. Serial No. 48,070.

Most processes for the manufacture of alkyl amines yield a mixture of primary, secondary and tertiary amines, which mixture must then be put through a separating process, usually distillation to recover the several amines in a relatively uncontaminated state. The alkylation of aniline or its homologues in the manufacture of mixed alkyl aryl amines usually gives a mixture of secondary and tertiary amines which must be further separated. Obviously these double-stage processes have the effect of increasing the cost of the individual amines which are being manufactured. There are certain chemical reactions in which the by-product, or by-products, may consist largely or in part, as the case may be, of amines, and most frequently mixtures of primary, secondary and tertiary amines.

The present invention has for its primary object the separation of a mixture of amines by the formation of compounds of the amines without first carrying out a separation of the amines themselves. Another object of the invention is to utilize a mixture of primary, secondary, and tertiary amines for the formation of useful products. Still another object is to provide an improved method for manufacturing thiuramdisulphides from mixtures of amines. A further object is to recover tertiary amines from mixtures with primary and secondary amines. The invention also includes the manufacture of tetra-alkylated thiuramdisulphides.

With a preferred method in mind, but without desiring to place undue limitations upon the scope of the invention beyond what may be required by the prior art, the invention briefly consists in treating a mixture of primary, secondary and tertiary amines with carbon bisulphide, oxidizing the reaction products, and removing them, and recovering tertiary amine from the solution.

When a mixture of amines dissolved in water or in another suitable solvent is treated with carbon bisulphide, the primary and secondary amine may function in two ways. One molecule of either may add to the carbon bisulphide to form the corresponding dithiocarbamic acid. Another molecule of either primary or secondary amine may function as a base, reacting with the dithiocarbamic acid which has been formed to yield the corresponding alkyl ammonium salt. The tertiary amine which may be present in the mixture functions only as a base.

These reactions may be expressed:

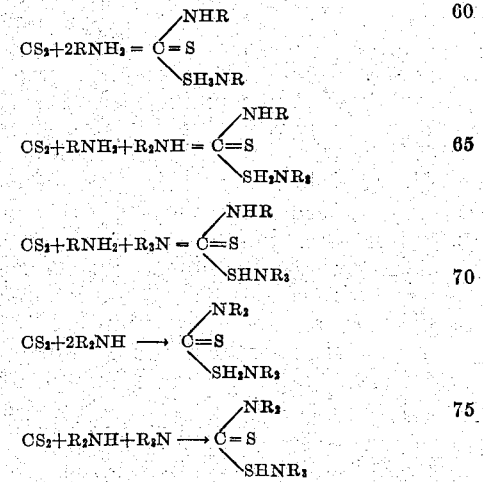

As a specific example, the following is given: A water solution of dimethylamine and trimethylamine sulphate, containing a trace of methyl amine sulphate, the mixture of the amines, containing 19.3 lbs. of nitrogen, may be treated with 55.0 lbs. of sodium hydroxide dissolved in water. This amount of sodium hydroxide is the exact amount required to liberate the amines from their salts. By maintaining the temperature at 20-25° C. and keeping the concentration of the reaction mixture below the saturation point of the amines in the water present, the amines can be retained in solution without any loss. To the solution of free amines may then be added 52.4 lbs. of carbon bisulphide. Then, with stirring and cooling, 156 lbs. of a 7.5% solution of hydrogen peroxide containing 34.6 lbs. of 98% sulphuric acid is slowly run in. Tetramethylthiuramdisulphide is formed in this reaction by the oxidation of the dithiocarbamic acid compound of the secondary amine. The tertiary amine remains in solution as the sulphate. The primary amine reaction product will be oxidized at the same time to the corresponding mustard oil. The latter reaction may be briefly expressed as

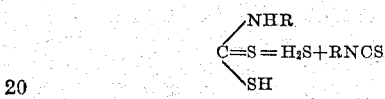

When the primary amine is present only in very small amounts or in traces, the thiuramdisulphide can be nicely precipitated and can be easily filtered out of the reaction mixture. The filtrate may then be concentrated, and any amine which has remained dissolved as sulphate may then be liberated by the further addition of 27.5 lbs. of sodium hydroxide in water solution, again maintaining temperature and concentration conditions so that the amines will remain in solution. The addition of 26.2 lbs. of carbon bisulphide followed by the addition of 78.2 lbs. of a 7.5% solution of hydrogen peroxide containing 17.3 lbs. of 98% sulphuric acid, added with stirring and cooling, forms a further amount of the thiuramdisulphide which may be filtered, washed and dried, and combined with the disulphide formed above. The filtrate now contains only teritiary methyl amine sulphate and sodium sulphate in water. The tertiary amine may be recovered by making the solution alkaline, distilling off the amine, and absorbing it in water. The object of the second treatment with carbon bisulphide is to recover any primary or secondary amine or both which may have functioned as a base in the first reaction. If, however, the amount of tertiary amine present is exactly sufficient to neutralize the dithio carbamic acid formed by the primary and secondary amines in reaction with the carbon bisulphide, the result will be a neutral solution containing the primary and secondary amines as the tertiary ammonium salts of the corresponding dithio carbamic acid. An excess of tertiary amine in the reaction mixture will remain as free amine. By properly adjusting the amount of tertiary amine present by the addition of further quantities of the amine or of another suitable base which does not react with the carbon disulphide, all of the primary and secondary amines may be caused to react with the carbon-disulphide. The reactions may be expressed:

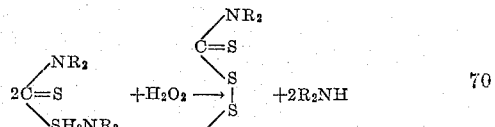

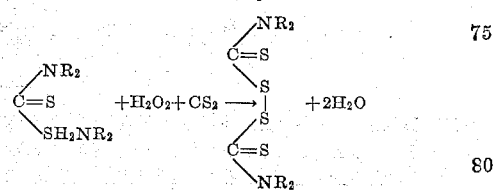

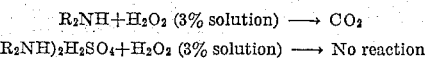

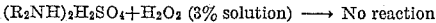

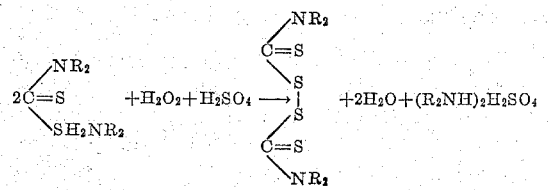

With certain oxidizing agents, as for example the halogens, there is formed an equivalent amount of acid in the reaction, and the tertiary amine will appear as the halide salt. Where oxidizing agents do not act in this manner it has been found convenient to combine with them sufficient acid to neutralize the tertiary amine as fast as it is liberated, and thus the reaction mixture may be maintained neutral throughout.

If the amount of primary amine in the mixture is large, the mustard oil formed after oxidation of the dithiocarbamic acid may cause the thiuramdisulphide to appear as a gummy mass. This mustard oil may be separated from the thiuramdisulphide by steam distillation or other suitable means. If the amount of mustard oil be small, the thiuramdisulphide will precipitate normally, and the mustard oil can be volatilized away during the drying operation.

The separation of the mustard oil from the thiuramdisulphide may be carried out with quantitative precision, thus indicating that the method in the above example can be readily employed as a quantitative means of analyzing a mixture of amines for the amount of primary, secondary and tertiary amine present.

The following example may be used to illustrate the invention: In the manufacture of triethyltrimethylenetriamine which consists in adding ethyl chloride to hexamethylenetetramine, hydrolizing the addition product, and condensing the amine so formed with the formaldehyde simultaneously liberated, there results a by-product containing substantially ammonia, primary, secondary and tertiary methylamines, and primary ethylamine. Of the four nitrogens in hexamethylenetetramine only one appears as triethyltrimethylenetriamine, and of the six methylene groups, only one. The by-product accordingly results from the action of the methylene residues on the ammonia whereby the latter is more or less methylated to form methyl amines. The by-product contains secondary and tertiary methylamine together with traces of primary methyl amine and ethyl amine, ethyl methyl amine, diethyl amine, methyl methyl ethyl amine, and methyl ethyl ethyl amine. To a solution of these amines as sulphates containing in total, 42.8 lbs. of nitrogen, is added 122.4 lbs. of sodium hydroxide dissolved in water. The amines liberated by the sodium hydroxide may be evolved by heating and subsequently absorbed in water. This amine solution may then be treated with 116.3 lbs. of carbon bisulphide, and then, with cooling and stirring is further treated with 348 lbs. of a 7.5% solution of hydrogen peroxide containing 76.3 lbs. of 98% sulphuric acid. As in the first example the dithiocarbamic acid reaction products are oxidized to tetra-alkylated thiuramdisulphide. The disulphide appears as a precipitate and may be filtered out, washed and dried. The filtrate from the tetra-alkylated thiuramdisulphide may then be concentrated and neutralized by the addition of 61.2 lbs. of soduim hydroxide dissolved in water, adding the sodium hydroxide slowly to prevent the reaction mixture from becoming heated, and further maintaining the temperature and concentration at a point at which the amine will remain in solution and will not be volatilized. To the solution of amines thus obtained are then added 58.2 lbs. of carbon bisulphide and thereafter, with stirring and cooling, 173.5 lbs. of a 7.5% solution of hydrogen peroxide dissolved in water, containing 38.3 lbs. of 98% sulphuric acid. The tetra-alkylated thiuramdisulphide thus formed may be filtered out, washed and dried. The filtrate contains only tertiary amine sulphates together with sodium sulphate. The amines may be recovered by making the solution alkaline, boiling off the amine, and absorbing the water.

As triethyltrimethylenetriamine does not react with sodium hydroxide nor with carbon disulphide, it is not essential to separate the former compound from its reaction mixture until a later stage, and the present invention may be carried out on the entire reaction mixture containing the triethyltrimethylenetriamine and the various amine by-products mentioned above. The proper amount of caustic soda is added to liberate the amine by-products from their salts, but the temperature and the concentration of the mixture are preferably chosen so that the amines will remain in solution. The treatment with carbon disulphide and the oxidation with hydrogen peroxide are then carried out. The alkylated thiuramdisulphide and the mustard oil are removed as in the above examples, and the further treatment of the filtrate from the thiuramdisulphide is also carried out as above. The triethyltrimethylene triamine remains in the filtrate with the tertiary amine, from which it may be separated as follows:

The filtrate containing the tertiary amine and the triethyltrimethylenetriamine is treated with an approximately equal volume of 50% solution of sodium hydroxide or other suitable base. The tertiary amine is evolved and may be collected in water or in any suitable way. The polymerized triethyltrimethylenetriamine may then be floated off as an oil and collected.

It is not essential to the invention to adjust exactly the amount of tertiary amine in the mixture of amines in any of the above examples. Where insufficient tertiary amine is present to neutralize the dithiocarbamic acids, the filtrate from the thiuramdisulphide will contain primary and secondary amines together with tertiary amine and must be separated therefrom or otherwise utilized. An excess of tertiary amine will impart an alkaline reaction to the mixture after the treatment with carbon disulphide. If the tertiary amine be of a volatile nature, care must be taken to prevent the loss of the amine, either by collecting its vapors or by proceeding under conditions adapted to prevent its volatilization.

An excess of non-volatile tertiary amine may interfere physically or chemically with the most satisfactory progress of the reaction.

Where only primary and secondary amines are originally present, any other suitable base may be added, provided the base chosen does not react with the carbon disulphide or otherwise interfere with the progress of the reaction, and will form a sufficiently stable salt with the dithiocarbamic acid, and does not interfere in any way with the oxidation reaction.

Having thus described our invention, what we claim and desire to protect by Letters Patent is:

1. A process for treating a mixture of amines which comprises reacting with carbon bisulphide on the primary and secondary amines therein, oxidizing the reaction products in the presence of an acid to thereby form an insoluble material, removing the insoluble material from the solution, and recovering tertiary amine from the solution.

2. A process for treating a mixture of amines which comprises reacting with carbon bisulphide on the primary and secondary amines therein and oxidizing the reaction products in the presence of a mineral acid, separating the insoluble oxidation products from the solution, and recovering free tertiary amine from the filtrate by treatment with a base.

3. A process for treating a mixture of amines which comprises reacting on the primary and secondary amines therein with carbon bisulphide, oxidizing the reaction products with hydrogen peroxide in the presence of sulphuric acid to form alkylated thiuram disulphide and mustard oil, removing the oxidized reaction products, separating out the alkylated thiuramdisulphide from the mustard oil formed, treating the residues with a base, and distilling and recovering free tertiary amine therefrom.

4. A process for treating a mixture of amines which comprises reacting on primary and secondary amines with carbon bisulphide, oxidizing the reaction products with hydrogen peroxide in the presence of sulphuric acid to form alkylated thiuram disulphide and mustard oil, removing the oxidized products, separating out the alkylated thiuramdisulphide from the mustard oil formed, treating the residues with a base, distilling and recovering free tertiary amine therefrom, and repeating the treatment of residual amines with carbon bisulphide, oxidation and separation until the filtrate contains tertiary amine only, and recovering the tertiary amine therefrom.

5. A process for treating a mixture of amine salts which comprises liberating the free amines in solution, reacting with carbon bisulphide on the primary and secondary amines therein, oxidizing the reaction products to an insoluble state by means of a peroxide in the presence of a mineral acid, removing the insoluble material from the solution, and recovering tertiary amine from the solution.

6. A process for treating a mixture of amine salts which comprises liberating the free amines in solution by treatment with sodium hydroxide, reacting with carbon bisulphide on the primary and secondary amines therein and oxidizing the reaction products in the presence of an acid adapted to form a soluble salt with the liberated primary, secondary and tertiary amines, removing the oxidation products from the solution, and recovering tertiary amine from the solution.

7. A process for treating a mixture of amine salts which comprises liberating the free amines in solution by treatment with sodium hydroxide, reacting with carbon bisulphide on the primary and secondary amines therein and oxidizing the reaction products with an inorganic agent in the presence of a mineral acid, separating the insoluble oxidation products from the solution, and recovering free tertiary amine from the residues by treatment with a base.

8. A process for treating a mixture of amine salts which comprises liberating the free amines in solution by treatment with sodium hydroxide, reacting on the primary and secondary amines with carbon bisulphide, oxidizing the reaction products with hydrogen peroxide in the presence of sulphuric acid to form alkylated thiuram disulphide and mustard oil removing the oxidized reaction products from the mixture, separating out the alkylated thiuramdisulphide from the mustard oil formed, treating the residues with a base, and distilling and recovering free tertiary amine therefrom.

9. A process for treating a mixture of amine salts which comprises liberating the free amines in solution by treatment with sodium hydroxide, reacting on the primary and secondary amines with carbon bisulphide, oxidizing the reaction products with hydrogen peroxide in the presence of sulphuric acid to form alkylated thiuram disulphide and mustard oil, removing the insoluble oxidized products from the mixture, separating out the alkylated thiuramdisulphide from the mustard oil formed, treating the filtrate with a base, distilling and recovering free tertiary amine therefrom, and repeating the treatment with carbon bisulphide, oxidation and separation until the filtrate contains tertiary amine only.

10. A process which comprises converting secondary amine into dithiocarbamate by treatment with carbon disulphide, making a thiuramdisulphide therefrom by oxidation in the presence of acid until substantially all of the secondary amine has been converted into a thiuramdisulphide, and recovering the tetra alkylated thiuramdisulphide.

11. A process which comprises converting secondary amine in a mixture of amines into dithiocarbamate by treatment with carbon disulphide, making a thiuramdisulphide therefrom by oxidation in the presence of acid, and repeating said steps until substantially all of the secondary amine has been converted into a thiuramdisulphide, and recovering the tetra alkylated thiuramdisulphide.

12. A process which comprises reacting on a secondary amine with carbon disulphide to form a dithiocarbamate, converting said dithiocarbamate into a thiuramdisulphide by oxidation with a peroxide in the presence of a protective agent for the secondary amine liberated, recovering the thiuramdisulphide, recovering said secondary amine and retreating it to form a thiuramdisulphide therefrom, and recovering the thiuramdisulphide.

13. A process which comprises treating a secondary amine with carbon disulphide, oxidizing the dithiocarbamate thus formed to a thiuramdisulphide with an inorganic oxidizing agent in the presence of an agent adapted to neutralize the amine liberated, and recovering the thiuramdisulphide therefrom.

14. A process which comprises treating a secondary amine with carbon disulphide, oxidizing the dithiocarbamate thus formed to a thiuramdisulphide with hydrogen peroxide in the presence of an agent adapted to neutralize the amine liberated, and recovering the thiuramdisulphide therefrom.

15. A process which comprises treating a secondary amine with carbon disulphide, oxidizing the dithiocarbamate thus formed to a thiuramdisulphide with hydrogen peroxide in the presence of a protective agent for the amine liberated, and recovering the thiuramdisulphide therefrom.

16. A process which comprises treating a secondary amine with carbon disulphide, oxidizing the dithiocarbamate thus formed to a thiuramdisulphide with hydrogen peroxide in the presence of inorganic acid, and recovering the thiuramdisulphide therefrom.

17. A process which comprises treating a secondary amine with carbon disulphide, oxidizing the dithiocarbamate thus formed to a thiuramdisulphide with hydrogen peroxide in the presence of sulphuric acid, and recovering the thiuramdisulphide therefrom.

18. A process which comprises treating a secondary alkyl amine with carbon disulphide, oxidizing the alkyl dithiocarbamate thus formed to an alkylated thiuramdisulphide with hydrogen peroxide in the presence of sulphuric acid, and recovering the alkylated thiuramdisulphide therefrom.

19. A process which comprises treating dimethylamine with carbon disulphide, oxidizing the alkyl dithiocarbamate to tetramethylthiuramdisulphide with hydrogen peroxide in the presence of sulphuric acid, and recovering the tetramethyltriuramdisulphide therefrom.

Signed at New York, county and State of New York, this 31st day of July, 1925.

HAROLD S. ADAMS.

Signed at Naugatuck, county of New Haven, State of Connecticut, this 30th day of July, 1925.

LUDWIG MEUSER.

CERTIFICATE OF CORRECTION.

Patent No. 1,782,112.                                November 18, 1930.

HAROLD S. ADAMS, ET AL.

It is hereby certified that error appears in the printed specification of the above numbered patent requiring correction as follows: Page 5, line 43 - 44, for "tetramethyltriuramdisulphide" read tetramethylthiuramdisulphide; and that the said Letters Patent should be read with this correction therein that the same may conform to the record of the case in the Patent Office.

Signed and sealed this 28th day of June, A. D. 1938.

Henry Van Arsdale,
Acting Commissioner of Patents.

(Seal)